US006594618B1

(12) United States Patent
Azencott

(10) Patent No.: US 6,594,618 B1
(45) Date of Patent: Jul. 15, 2003

(54) SYSTEM MONITORING METHOD

(75) Inventor: Robert Azencott, Paris (FR)

(73) Assignee: Miriad Technologies, Paris (FR)

( * ) Notice: Subject to any disclaimer, the term of this patent is extended or adjusted under 35 U.S.C. 154(b) by 276 days.

(21) Appl. No.: 09/784,134

(22) Filed: Feb. 16, 2001

(30) Foreign Application Priority Data

Jul. 5, 2000 (EP) ............................................. 00410069

(51) Int. Cl.[7] ................................................ G06F 11/30
(52) U.S. Cl. ........................ 702/182; 709/224; 387/66
(58) Field of Search ................................ 702/119, 122, 702/123, 176, 180, 181, 182, 183, 187–189, 194, 196, FOR 103, FOR 104, FOR 134, FOR 135, FOR 139, FOR 170; 709/224; 714/787, 788, 789, 794, 795; 381/66

(56) References Cited

U.S. PATENT DOCUMENTS

| | | | | |
|---|---|---|---|---|
| 5,209,237 A | * | 5/1993 | Rosenthal | 600/511 |
| 5,299,148 A | * | 3/1994 | Gardner et al. | 702/196 |
| 5,583,792 A | * | 12/1996 | Li et al. | 709/224 |
| 5,586,066 A | * | 12/1996 | White et al. | 702/181 |
| 5,694,474 A | * | 12/1997 | Ngo et al. | 381/66 |
| 5,819,202 A | | 10/1998 | Sato et al. | 702/33 |
| 6,055,491 A | * | 4/2000 | Biliris et al. | 702/176 |
| 6,215,983 B1 | * | 4/2001 | Dogan et al. | 455/63 |
| 6,389,574 B1 | * | 5/2002 | Belveze et al. | 714/795 |

FOREIGN PATENT DOCUMENTS

| | | |
|---|---|---|
| DE | 197 55 133 | 6/1999 |
| WO | WO 00/10059 | 2/2000 |

OTHER PUBLICATIONS

Thomas E. Biedka, 1993 IEEE, E–Systems, Inc. Greenville Division, Title: Subspace–constrained SCORE Algorithms.*

* cited by examiner

*Primary Examiner*—Marc S. Hoff
*Assistant Examiner*—Mohamed Charioui
(74) *Attorney, Agent, or Firm*—McDermott, Will & Emery

(57) ABSTRACT

A method for monitoring a system based on a set of k performance indicators, $X_j(t)$, each of which is defined at successive times t, j being an integer varying between 1 and k. This method includes, for each indicator $X_j$, the steps of performing an observation of a sequence of s values, s being an integer, of the indicator and reordering this sequence into a reference list ordered by increasing values; and determining the relative rank, $REL[X_j(t)]$, in the reference list of any new value $XJ(t)$ of the indicator, this relative rank being equal to the rank of the new value divided by number s. The present invention also provides the computation of scores based on these relative ranks. Essential indicators and merged scores are deduced from these scores.

9 Claims, 1 Drawing Sheet

SYSTEM MONITORING METHOD

Figure 1:
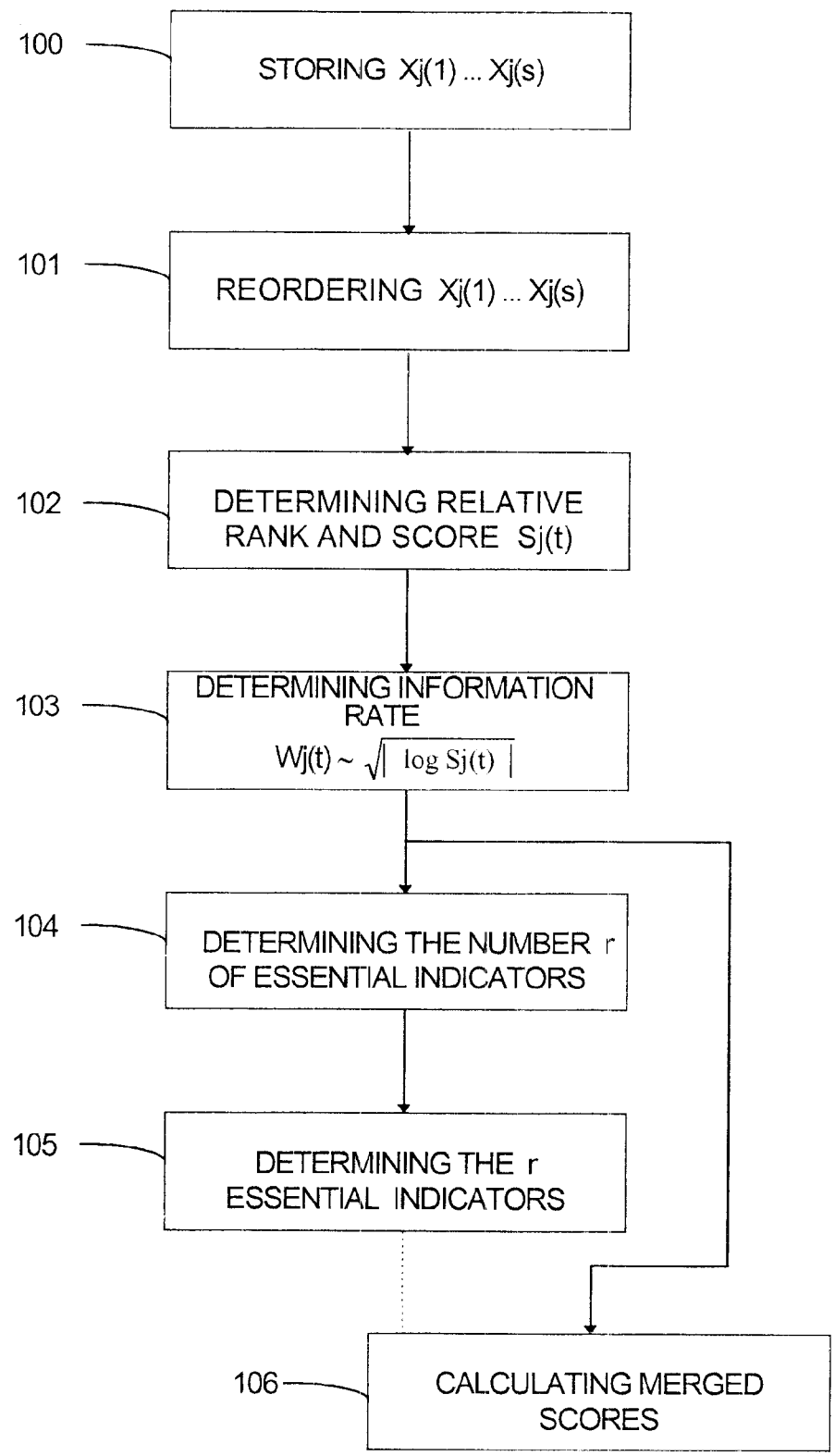

The present invention relates to a method for monitoring a complex system to provide decisional software tools for the monitoring, the quantified evaluation, the merging, and the anticipation of system performances.

Systems that can be associated with a computerized database, in which the current digital values of a group of digitized data, here called performance indicators, are stored at various time rates, are here considered.

The performance indicator database must be manageable by one of the many available database management systems (DBMS), such as, for example, ORACLE, IP21, etc. The database may be of "real time" type, but it may also be of "static" type with a periodic or interactive updating.

The system whose performances are to be analyzed may for example be an industrial production line in very varied sectors such as for example:

chemistry (product quality for a chemical reactor),
pharmacy (automation of validation tests for drug production),
agribusiness (yeast manufacturing),
automobile industry (quality of parts produced by a stamping process) . . .

For this first application range, the performance indicators may be the digital or qualitative results of technical controls and/or physical measurements regularly performed on the quality of an industrial product, such as the weight, the density, the chemical concentrations, the aspect characteristics (color, transparency, viscosity . . . ), the presence and the intensity of listed manufacturing defects, etc.

The system to be analyzed may also be formed of machine tool parks, of vehicle or airplane fleets, of various industrial installations, in varied sectors such as, for example:

aeronautics (centralized anticipative maintenance of an airplane fleet),
automobile industry (centralized anticipative maintenance of a vehicle fleet),
transport (anticipative maintenance of a subway, train or bus fleet),
electronic components (anticipative maintenance of the machine tool park),
remote control of processing plants (remote maintenance of liquid air micro-plants) . . .

For this second range of applications, the performance indicators may be the numerical or qualitative results of technical controls, periodic inspections, physical or mechanical measurements, failure corrections, technical overhauls, and more generally any operation performed regularly or exceptionally to ensure the good working order, the reliability, and the availability of the different operational units of the monitored fleet or machine park. The performance indicators will thus for example make an inventory of the frequencies of the types of failures or technical incidents, of the effective digital values of critical operational characteristics, physical indicators of operation normality, etc.

A third range of applications concerns the computerized monitoring of the quality of services on telecommunication networks. Let us mention, as examples, the service quality monitoring and prediction on mobile telephone networks, and the multi-node monitoring and prediction of the communication performances on Internet or Intranet computer networks.

For this third range of applications, the performance indicators may be the digital or qualitative values of performance measurements provided by physical sensors and real-time computer systems, which systems are generally managed by the part manufacturers of a mobile telephone system, or by the integrators in charge of the installation of a communication network. The performance indicators will thus record, for example, the frequencies of various types of failures, alarms or technical incidents, the effective digital values of critical operational characteristics such as information output rates, geographically sorted telephone call rates, localized rates of unserved calls, physical indicators of localized operation normality, etc.

In all these systems, in the present state of the art, a great number of indicators are monitored, the evolution of each indicator is examined, and statistics are attempted to be made on the values of these indicators. However, this requires the permanent intervention of an engineer in front of his computer and of the database to select the processing techniques, trigger and evaluate the results. For example, in the above-mentioned case of the monitoring of a telephone network, to maintain a permanent check on the sound working of the system, it may be desired, for a large city such as Paris, to monitor up to 1200 geographic areas. In each geographic area, same ten distinct indicators will for example be monitored, such as traffic indicators, indicators of the number of unprocessed calls, indicators of problem calls, indicators of interrupted calls . . . Reading each of these ten indicators every 5 minutes leads to having to analyze every five minutes the new values of close to 12,000 distinct indicators (which amounts to approximately 144,000 new values per hour). Thus, in practice, in current systems, a trained data system engineer can at the very most directly monitor only a small number of geographic areas.

Thus, either the number of monitored indicators, or the update frequency of these indicators is necessarily reduced, which results in a less precise and more difficult prediction of possible defects resulting from a system degradation. One of the major difficulties, which prevents the computation of efficient syntheses for groups of indicators, is especially linked to the fact that the various performance indicators are often measured in different physical units, varying in very different ranges of values. Further, for each indicator, the optimal values may be high values or low values, or values close to a set point.

Thus, an object of the present invention is to facilitate the intelligent monitoring of the performances of a system, especially to predict the possible degradation of these performances, in a simple and rapid manner, while enabling the use of a great number of indicators, possibly of totally different natures.

A second object of the present invention is to facilitate the intelligent and fast monitoring of very large databases which may include up to hundreds of thousands of performance indicators, by automatically extracting as small a number as possible of essential performance indicators, from which all other performance indicators can be automatically recalculated with a good precision.

A third object of the present invention is to compute, starting from any group of observed indicators, a new performance indicator merging in a self-adaptive and rigorous manner the performance information brought by each of the indicators of the considered group, to provide synthetic and precise information about the performances of a smaller or larger subset of the monitored system.

To achieve these objects, the present invention provides a method for monitoring a system based on a set of k performance indicators, $X_j(t)$, each of which is defined at successive times t, j being an integer varying between 1 and k. This method includes, for each indicator Xj, the steps of performing an observation of a sequence of s values, s being an integer, of said indicator and reordering this sequence into a reference list ordered by increasing values; and determining the relative rank, R[Xj(t)], in said reference list of any new value Xj(t) of said indicator, this relative rank being equal to the rank of the new value divided by the number s.

According to an embodiment of the present invention, from each relative rank R[Xj(t)] a score Sj(t) expressed in the form of a percentage is determined, in such a way that said score becomes smaller whenever the performance becomes better.

According to an embodiment of the present invention, the score is expressed by formula Sj(t)=100{1−R[Xj(t)]/s} provided the indicator increases as the performance improves.

According to an embodiment of the present invention, it is further provided a method to determine from each relative rank R[Xj(t)] an information rate wj(t) proportional to the square root of the absolute value of the logarithm of the relative rank.

According to an embodiment of the present invention, the information rate (W) is defined from a score (S) by the following succession of formulas:

$$U = S/50 \quad \text{if } 0 < S < 50$$
$$U = [100 - S]/50 \quad \text{if } 50 < S < 100$$
$$V = -\log U$$
$$W = +\sqrt{2V} \quad \text{if } 0 < S < 50$$
$$W = -\sqrt{2}\,V \quad \text{if } 50 < S < 100.$$

According to an embodiment of the present invention, it is further provided, for any group of k initial indicators (X1, X2, X3 . . . Xk), a method to determine a number r of essential indicators, r being smaller than k, from which all initial indicators of said group can be restored with a good precision, by the steps consisting of forming the information rate correlation matrix; searching the eigenvalues of this matrix; and determining the smallest integer r such that the sum of the r greatest eigenvalues is very close to the general sum L of all the eigenvalues of this matrix, and more precisely is greater than a chosen percentage of the above general sum L.

According to an embodiment of the present invention, it is further provided to determine the r essential indicators by the steps of searching, among the k column vectors of the information rate correlation matrix, the group of r column vectors that define a maximum volume in an r-dimensional space; forming the list (LISTOPT) of the column numbers of the r column vectors thus determined; and retaining as the essential indicators the r indicators Sj(t), the index j of which appears in the above list (LISTOPT).

According to an embodiment of the present invention, it is further provided, for any group of k scores (S1, S2, S3, . . . Sk), a method to determine a merged score SF, calculated from a weighted average of the corresponding information rates (W1, W2, W3 . . . Wk), by the steps of choosing for each initial score Sj a positive or null significance coefficient Cj, while ensuring that the sum of coefficients Cj is equal to 1; calculating at each time t an average information rate TAU(t) by a weighted average of the k information rates Wj(t), the ponderating coefficient of number Wj(t) being significance coefficient Cj; calculating the standard deviation "a" of the values taken along the time scale by average rate TAU(t) based on the correlations between information rates Wj(t); resealing the values taken by the average rate TAU(t), by systematically dividing this average rate by its standard deviation "a", which determines a merged information rate defined by WF(t)=TAU(t)/a; and constructing a merged score SF(t) proportional to the exponential of a fixed negative multiple of the square of the merged information rate WF(t).

According to an embodiment of the present invention, it is further provided, for a group G of k arbitrary scores (S1, S2, S3 . . . Sk), to determine a merged score SF, calculated from the ordinary average of r essential information rates by the steps of searching the number r of essential scores; searching the r essential scores in the group G of the above k scores, and deducing therefrom the r corresponding essential information rates; determining at each time t the ordinary average MOY(t) of the r essential information rates; calculating standard deviation "a" of the values taken along time by average MOY(t), using the correlations between essential information rates; resealing the values taken by average MOY(t) by systematically dividing this average by its standard deviation "a", which determines a merged information rate WF(t)=MOY(t)/a; and constructing a merged score SF(t) proportional to the exponential of a fixed negative multiple of the square of the merged information rate WF(t).

The foregoing objects, features and advantages of the present invention will be partly described in relation with a general flow chart illustrated in FIG. 1.

First Aspect of the Present Invention

Determination of Universal Performance Scores

According to a first aspect of the present invention, it is desired to substitute to performance indicators Xj(t) that vary in any manner in time, and which may be expressed in fundamentally different physical units, Performance scores Sj(t) which correspond to relative values with no dimension, expressed, for example in percents, and forming performance evaluations that are fundamentally comparable from one score to another.

It is thus determined by an observation of the associated score whether the current value of a performance indicator corresponds to a value taken from a determined percentage of best values among the expected values. The variations of any two indicators can thus easily be quantified by the associated scores, and above all be compared to each other, even if these two indicators measure distinct performances in different units.

The sole provision of these scores thus enables following and comparing in a strict manner a set of performance indicators and their drifts.

The scores provided according to the present invention have another technical advantage: the statistic distribution of the successive values taken in time by any given such score Sj(t) always is a uniform distribution over the interval of values between 0% and 100%, whereas the statistical distribution of the successive values taken by the corresponding initial performance indicator Xj(t) generally follows a totally unknown statistical law, which is also totally different from one indicator to another. The fact that scores Sj according to the present invention have the above mathematical property (same uniform statistic distribution) plays an essential technical role in the rigorous evaluations of merged scores discussed according to the third aspect of the present invention.

An embodiment of this first aspect of the present invention will be described in relation with steps 100 to 102 of FIG. 1.

In a first step, 100, a performance indicators database is established. As previously indicated, these indicators may measure performances of very different physical natures, for example include pressures, temperatures, viscosities, outputs, frequencies . . . In this database, the successive values of a great number (k) of performance indicators X1(t), X2(t) . . . Xj(t) . . . Xk(t) will be stored along time (t).

In a second step, 101, for each performance indicator Xj, a reference list of s successive values that are classified by order of increasing values is isolated:

$$Xj(1), Xj(2) \ldots Xj(i), Xj(i+1) \ldots Xj(s),$$

s being a positive integer of high value, for example greater than 100.

In a third step, 102, the rank of each new value Xj(t) of each indicator Xj is defined in the corresponding reference list Xj(1) . . . Xj(s) and a relative rank associated with this new value Xj(t) is defined. Relative rank R[Xj(t)] is equal to the rank of the new value Xj(t) among the s previously-stored values, divided by number s. Thus, if value Xj(t) is included between two consecutive values Z(i), Z(i+1) of the above-mentioned ordered reference list of s values, the rank of Xj(t) will be equal to i and its relative rank will be equal to i/s.

Based on this relative rank, score Sj(t) associated with indicator Xj(t) is defined as a percentage:

$$Sj(t)=100\{1-R[Xj(t)]/s\}=100[1-(i/s)].$$

The intuitive interpretation of the score is made clearer by the following example. If score Sj(t) is equal to 4%, this means that the performance Xj(t) measured at time t was in the 4% best performances with respect to the reference list of the concerned indicator Xj. Thus, very small values of the score correspond to very good performances.

Such a score associated to each indicator is adequate when the value of the performance measured by this indicator is considered as being all the better as the indicator is greater.

According to a first alternative, if performance indicator X(t) varies inversely to the desirability of performance quality, that is, the smaller the digital value of X(t), the more desirable the corresponding performance, a new performance indicator is defined by Y(t)=−X(t) and the above calculation method is applied to Y(t) to obtain score S(t).

According to a second alternative, if the performance indicator X(t) is a performance measurement that the user desires to remain as close as possible to a nominal value B, the absolute value of the difference between X(t) and B is called Z(t), which forms a performance indicator that comes under the first alternative, so that the score S(t) associated with X(t) can be calculated by applying the preceding case to performance indicator Z(t).

Subsidiarily, it should be noted that it is possible and simple to recalculate with a good accuracy the value of the initial indicator Xj(t) based on that of the associated score Sj(t). For this purpose, the relative rank R[Xj(t)] of Xj(t) in the reference list is first recalculated based on Sj(t), which provides the two consecutive values of the reference list that surround the unknown value Xj(t), that can then be estimated by the average of these two consecutive values.

Second Aspect of the Present Invention
Extraction of the Essential Performance Indicators According to a second aspect of the present invention, essential performance indicators are determined. These essential indicators are formed of as reduced a number as possible of the initial indicators, from which the values of all the other performance indicators can be automatically restored with a good accuracy. The scores associated with the essential indicators will be called the essential scores.

This family of essential performance indicators enables, due to its reduced size, facilitating and improving the intelligent and fast monitoring of very large databases that may include up to hundreds of thousands of performance indicators, since the information provided by the essential indicator family is enough to restore all the performance indicators of the monitored system.

An embodiment of the determination of this essential indicator family will be described in relation with steps 103 to 105. According to this embodiment, the number r of essential indicators is first determined and then only it is determined which the r essential indicators are.

In a preliminary step 103, an information rate W(t) associated with each score S(t) is calculated for this score. Information rate W(t) is defined as a value proportional to the square root of the absolute value of the logarithm of score S(t). The fact that the scores have a uniform statistic distribution, as indicated hereabove, results, provided that the number of samples previously stored to define the rank of any new indicator is a sufficiently large integer s, for example greater than one hundred, in that information rates W(t) will have a substantially gaussian probabilistic distribution.

An information rate Wj(t) (or, to simplify, W) can for example be calculated based on a score Sj(t) (or, to simplify, S) by the successive following formulas:

$$U = S/50 \quad \text{if } 0 < S < 50$$

$$U = [100-S]/50 \quad \text{if } 50 < S < 100$$

$$V = -\log U \quad (v \text{ is always} \geq 0)$$

$$W = +\sqrt{2V} \quad \text{if } 0 < S < 50$$

$$W = -\sqrt{2V} \quad \text{if } 50 < S < 100.$$

Subsidiarily, it should be noted that the above calculation may also be used reversibly, that is, the values of S can be restored based on the values of W by the following successive formulas:

$$V = W^2/2$$

$$U = e^{-V}$$

$$S = 50 \times U \quad \text{if } W > 0$$

$$S = 100 - [50 \times U] \quad \text{if } W < 0.$$

In a step 104, given any group G of performance indicators X1, X2, X3 . . . Xk, the number r of the essential indicators included in this group G of indicators is determined. Number r will be called the effective dimension of group G of indicators.

First, score Sj(t) and the associated information rate Wj(t) are calculated for each integer j between 1 and k. The information rate values (W1, W2, W3 . . . Wk) will be available for times t between 1 and N, for example.

By a known algorithmic method, applicable to gaussian random values, matrix M of the empirical correlations between the above information rates (W1, W2, W3 . . . Wk) is calculated, the notion of correlation matrix used herein being defined in "Multi-variate Analysis" (K. V. Mardia, J. T. Kent, J. M. Bibby, Academic Press 1979). Matrix M is a symmetrical square matrix with k rows and k columns $$M=[Mij]$$

the numerical coefficients Mij of which are calculated, for i and j included between 1 and k, by the following successive formulas:

$MOYj=(1/N)\times$[sum of the $Wj(t)$], for $1<t<N$ $Hj(t)=Wj(t)-MOYj$, for $1<t<N$ $VARj=(1/N)\times$[sum of the squares of the $Hj(t)$] for $1<t<N$ $TYPj=\sqrt{VARj}$ $Kj(t)=Hj(t)/TYPj$ $Mij=(1/N)\times$[sum of the $Ki(t).Kj(t)$] for $1<t<N$.

Then, by known calculation methods, symmetrical matrix M is explicitly diagonalized. The k eigenvalues $L1>L2>L3> \ldots >Lk$ of M (which are always real, positive or null) are calculated. The sum of all these eigenvalues is called L.

The user of the method then chooses a degree of compression COMP that is a percentage generally included between 90 and 99%, and then determines the smallest integer r between 1 and k, such that:

$L1+L2 \ldots +Lr>L\times COMP$.

Integer r will be called the effective dimension of the above group G of performance indicators X1, X2, X3 ... Xk, or the effective dimension of the associated score group (S1, S2, S3 ... Sk), or the effective dimension of the associated information rate group (W1, W2, W3 ... Wk).

Thus, at the end of step 104, the number r of essential performance indicators has been determined.

In a step 105, it is provided a method to determine the list of these r essential indicators included in above-mentioned group G of k performance indicators.

A first practical advantage of extracting this family of r essential indicators (and of the associated essential scores) is that this operation very often enables strongly limiting the effective number of performance indicators to be observed and memorized. Indeed, most of the information contained in the set of k initial indicators of group G is provided by the r essential indicators, and it is besides possible, as will be explained hereafter, to restore with a good accuracy the values of all initial indicators of group G, based on the sole essential indicators.

To implement step 105, the above-mentioned empirical correlation matrix M is used again, and the k eigenvectors Q1, Q2 ... Qk of matrix M, which necessarily form an orthonormal base, are calculated.

Then, the list of the k column vectors of empirical correlation matrix M, which are vectors of identical dimension k, is called $COL=(Z_1, Z_2, Z_3 \ldots Z_k)$.

A sub-family F of r column vectors of M is arbitrarily selected from list COL:

$F=(F_1, F_2, F_3 \ldots F_r)$ so that each one of the vectors $F_m$ is identical to a certain column vector $Z_{im}$ of list COL.

A square matrix A having r lines and r columns, called A=[Aij], is associated with this sub-family F, digital coefficient Aij corresponding to the scalar product of vectors Fi and Qj, where integers i and j vary between 1 and r.

Quality Q(F) of sub-family F is defined by:

$Q(F)$=absolute value of the determinant of matrix $A$.

The sub-families (such as F) formed of r column vectors of M form a finite set of sub-families, and it is thus possible to explore them methodically one after the other to select a sub-family of optimal quality called $F_{opt}$, such that quality $Q(F_{opt})$ is maximal among all possible numbers $Q(F)$ when F varies in the set of all the sub-families formed of r column vectors of M.

In other words, this amounts to searching the group of r column vectors of the empirical correlation matrix of the information rates that defines a maximum volume in an r-dimensional space.

Generally, such an optimal sub-family $F_{opt}$ will be unique; if not, any one of the found optimal sub-families will be chosen for $F_{opt}$.

Let us define vector sub-family $F_{opt}$ as follows:

$F_{opt}=(Z_{i1}, Z_{i2} \ldots Z_{ir})$ where the r integers $(i_1, i_2, i_3 \ldots i_r)$ are included between 1 and k, are distinct, and represent column numbers in matrix M.

Let us call LISTOPT the list of the r column numbers determined hereabove.

$LISTOPT=(i_1, i_2, i_3 \ldots i_r)$.

Performance indicators $X_{i1}, X_{i2} \ldots X_{ir}$ will then be called the essential performance indicators extracted from the initial group G of indicators. Similarly, the corresponding scores $S_{i1}, S_{i2} \ldots S_{ir}$ will be called the essential scores. Finally, the corresponding information rates $W_{i1}, W_{i2} \ldots W_{ir}$ will be called the essential information rates.

The present invention further optionally provides a method for reconstructing with a good accuracy all indicators of the initial group G based on the sole essential indicators extracted from group G, according to the following calculation method, described with the same notations as in steps 104 and 105 hereabove.

Let us call VECT the vector space of dimension r generated by vectors $z_{i1}, z_{i2} \ldots z_{ir}$ of list $F_{opt}$.

Using a standard mathematical algorithm, and for each integer j between 1 and k, the vector ZZj obtained by orthogonal projection of vector Zj on vector space VECT is first calculated. This then enables also, by standard mathematical methods, the computation of numerical coefficients Bjp for $1<j<k$ and $1<p<r$, such that:

$ZZj$=sum of the $(Bjp\times Z_{ip})$ for $1<p<r$.

The formula to compute a good estimate WWj(t) for information rate Wj(t), based on essential information rates Wi1, Wi2 ... Wir, is then:

$WWj(t)=Bj1\times Wi1(t)+Bj2\times Wi2(t) \ldots +Bjr\times Wir(t)$.

Score Sj(t) can then be approximately estimated based on WWj(t) by replacing W(t) by WWj(t) and S(t) by Sj(t) in the formulas presented in relation with step 103.

Since the essential information rates are calculated on the sole basis of essential scores, as indicated hereabove, the above method thus provides an estimative calculation mode of all scores of initial group G, on the sole basis of essential scores.

As indicated in step 102, each indicator can be calculated from the corresponding score and conversely, so that the above method also provides a mode of estimative calculation of all indicators of initial group G, based on the sole essential indicators.

Third Aspect of the Present Invention

Self-adaptive Score Merging

The performance scores constructed at step 102 always are percentages between 0% and 100%, and have quite comparable practical significations from one score to another, since they measure relative ranks on such or such physical characteristic.

It is then natural to attempt mathematically combining various scores, for example to calculate scores of failure risks on an installation or a complex industrial system based on already evaluated risk scores on different components of this installation or sub-systems of the general system.

Thus, in the case of the monitoring of the performances of a telephone network, it may be attempted to obtain a new performance score merged by geographic area or by subsets of geographic areas.

At step 106, according to the third aspect of the present invention, it is thus provided a method to calculate a new score or merged score SF(t) that automatically and rigorously merges all performance indicators provided by any initial group of indicators X1(t), X2(t) . . . Xk(t).

This new score SF will be called the merged score of the score group S1, S2 . . . Sk associated with indicators X1, X2 . . . Xk.

The user of the method starts by quantifying the practical significance that he grants each score Sj, for example in terms of cost for performance loss, by determining a positive significance coefficient COEFj, this for each integer j between 1 and k. The greater this significance coefficient, the more the corresponding score will play a significant role in evaluating merged score SF(t).

The determination of merged score SF(t) is carried out in six successive operations.

The first operation is to standardize the significance coefficients so that their sum is equal to 1.

The sum of numbers COEFj for j varying from 1 to k is called TOT, and standardized significance coefficients Cj=COEFj/TOT are calculated.

The second operation is to then calculate for each performance indicator the associated information rate Wj(t), for times t between 1 and N, for example.

The third operation consists of defining the average rate TAU(t) obtained by weighted average of information rates Wj(t), in which average each rate Wj(t) is assigned the coefficient Cj introduced hereabove. This is reflected by the following formula:

$$TAU(t) = \text{sum of the } Cj.Wj(t) \text{ for } 1 < j < k.$$

The fourth operation is to determine the standard deviation "a" of the values taken by rate TAU(t). Square "a²" of this standard deviation, that is, the variance of TAU(t), can be calculated with the following explicit formula:

$$a^2 = (1/k^2) \times [\text{sum of the } Mij.Ci.Cj] \text{ for } 1 < i, j < k$$

where coefficients Mij are the empirical correlations already determined hereabove at step 104.

The fifth operation is to standardize the scale of the values taken by rate TAU(t), by dividing TAU(t) by its standard deviation "a" calculated hereabove, which determines a merged information rate WF(t)=(1/a)×TAU(t).

The sixth operation is to determine the merged score SF(t), which is deduced from the merged information rate WF(t) by the formulas indicated at the end of step 103, which formulas enable explicitly restoring a score S based on its information rate W.

According to an alternative implementation of step 106, if the user does not really known what explicit quantitative significance COEFj to associate with score Sj(t), which will very often be the case in practice, the present invention provides a method defining a pertinent default choice based on the use of the essential scores. This aims at avoiding parasitic interferences between partially or totally redundant scores.

As in step 105, matrix M of the empirical correlations between information rates Wj(t) is successively calculated, after which the r essential information rates $W_{i1}(t)$, $W_{i2}(t)$ . . . $W_{ir}(t)$ are determined.

Default significance coefficients are then defined, and calculated as follows:

COEFj=1/r if Wj is any one of the r essential information rates;

COEFj=0 if Wj is not one of the r essential information rates.

With such default significance coefficients, it may then be proceeded exactly as just described hereabove in the connection with step 106, to determine a merged score SF(t).

What is claimed is:

1. A method for monitoring a system based on a set of k performance indicators, Xj(t), each of which is defined at successive times t, j being an integer between 1 and k, including, for each indicator Xj, the steps of:

performing an observation of a sequence of s values, s being an integer, of said indicator and reordering this sequence into a reference list ordered by increasing values; and determining the relative rank, R[Xj(t)], in said reference list of any new value Xj(t) of said indicator, this relative rank being equal to the rank of the new value divided by number s.

2. The method of claim 1, further consisting of determining, from each relative rank R[Xj(t)], a score Sj(t) expressed in the form of a percentage which decreases as performance improves.

3. The method of claim 2, further consisting of determining, from each relative rank R[Xj(t)], an information rate Wj(t) proportional to the square root of the absolute value of the logarithm of the relative rank.

4. The method of claim 3, further including a step which, for any group of k initial indicators (X1, X2, X3 . . . Xk), determines a number r of essential indicators, r being smaller than k, essential indicators from which all initial indicators of said group can be restored with a good precision, including the steps of:

forming the information rate correlation matrix;

computing the eigenvalues of this matrix; and determining the smallest integer r such that the sum of the r greatest eigenvalues is approximately equal to the general sum L of all the eigenvalues of this matrix, and more precisely is greater than a chosen percentage of the above general sum L.

5. The method of claim 4, further consisting of determining the r essential indicators by the steps of:

searching, among the k column vectors of the information rate correlation matrix, the group of r column vectors that define a maximum volume in an r-dimensional space;

forming the list (LISTOPT) of the column numbers of the r column vectors thus determined; and retaining as the essential indicators the r indicators Sj(t), the index j of which appears in the above list (LISTOPT).

6. The method of claim 5, further consisting, for a group G of k arbitrary scores (S1, S2, S3 . . . Sk), of determining a merged score SF, calculated from the ordinary average of r essential information rates by the steps of:

searching according to the method of claim 4 the number r of essential scores;

searching according to the method of claim 5 the r essential scores in the group G of the above k scores, and deducing therefrom the r corresponding essential information rates by the method of claim 5;

determining at each time t the ordinary average MOY(t) of the r essential information rates;

calculating standard deviation "a" of the values taken along time scale by average MOY(t), from the correlations between essential information rates;

rescaling the values taken by average MOY(t) by systematically dividing this average by its standard deviation "a", which determines a merged information rate WF, such that WF(t)=(1/a)×MOY(t); and constructing a merged score SF(t) proportional to the exponential of a fixed negative multiple of the square of the merged information rate WF(t).

7. The method of claim 3, wherein the information rate (W) is defined from a score (S) by the following succession of formulas:

$$U = S/50 \quad \text{if } 0 < S < 50$$
$$U = [100 - S]/50 \quad \text{if } 50 < S < 100$$
$$V = -\log U$$
$$W = +\sqrt{2}\, V \quad \text{if } 0 < S < 50$$
$$W = -\sqrt{2}\, V \quad \text{if } 50 < S < 100.$$

8. The method of claim 3, further consisting, for any group of k scores (S1, S2, S3 . . . Sk), of determining a merged score SF, calculated from a weighted average of the corresponding information rates (W1, W2, W3 . . . Wk), by the steps of:

choosing for each initial score Sj a positive or null significance coefficient Cj, while ensuring that the sum of coefficients Cj is equal to 1;

calculating at each time t an average rate TAU(t) by a weighted average of the k information rates Wj(t), the ponderating coefficient of number Wj(t) being the significance coefficient Cj;

calculating the standard deviation "a" of the values taken along time by average rate TAU(t) based on the correlations between information rates Wj(t);

rescaling the values taken by the average rate TAU(t), by systematically dividing this average rate by its standard deviation "a", which determines a merged information rate WF defined by WF(t)=(1/a)×TAU(t); and constructing a merged score SF(t) proportional to the exponential of a fixed negative multiple of the square of the merged information rate WF(t).

9. The method of claim 2, wherein the score Sj(t) is expressed by formula:

$$Sj(t)=100\{1-R[Xj(t)]/s\}$$

when the indicator increases as performance improves.

* * * * *